(12) United States Patent
Mamba (10) Patent No.: US 10,920,837 B2
(45) Date of Patent: Feb. 16, 2021

(54) CLUTCH DEVICE AND RETAINER THEREOF

(71) Applicant: MAMBA Ltd., Tokyo (JP)

(72) Inventor: Ichiro Mamba, Tokyo (JP)

(73) Assignee: MAMBA Ltd., Tokyo (JP)

( * ) Notice: Subject to any disclaimer, the term of this patent is extended or adjusted under 35 U.S.C. 154(b) by 0 days.

(21) Appl. No.: 16/818,465

(22) Filed: Mar. 13, 2020

(65) Prior Publication Data

US 2020/0292014 A1 Sep. 17, 2020

(30) Foreign Application Priority Data

Mar. 14, 2019 (JP) .............................. JP2019-047235

(51) Int. Cl.
*F16D 43/14* (2006.01)

(52) U.S. Cl.
CPC .................................. *F16D 43/14* (2013.01)

(58) Field of Classification Search
CPC ................................ F16D 43/14; F16D 43/18
See application file for complete search history.

(56) References Cited

U.S. PATENT DOCUMENTS

| 2,672,226 A * | 3/1954 | Zeidler | F16D 43/08 |
| | | | 192/105 C |
| 6,247,570 B1 * | 6/2001 | Zindler | F16D 43/18 |
| | | | 192/105 BA |
| 8,297,425 B1 * | 10/2012 | le Roux | F16D 43/12 |
| | | | 192/83 |
| 2006/0231367 A1 | 10/2006 | Shigematsu | |
| 2009/0211868 A1 * | 8/2009 | Inomori | F16D 43/08 |
| | | | 192/83 |

FOREIGN PATENT DOCUMENTS

| EP | 1 837 543 A2 | 9/2007 |
| JP | 3808091 B | 8/2006 |
| JP | 2007-255441 A | 10/2007 |

* cited by examiner

*Primary Examiner* — Charles A Fox
*Assistant Examiner* — Lori Wu
(74) *Attorney, Agent, or Firm* — Wolf, Greenfield & Sacks, P.C.

(57) ABSTRACT

A retainer of a clutch device holds a weight held so as to be slidable in a substantially radial direction around a rotation axis. A push lever swings in response to a sliding movement of the weight, and, upon rotation, applies a centrifugal force to the weight to cause the weight to slide in an outer circumferential direction and brings an abutting end of the push lever into abutment with a pressure plate of the clutch device to apply a predetermined load to the pressure plate. The retainer includes a stopper to limit a movable range of the weight. At least the abutting end of the push lever is formed of an elastically deformable member.

6 Claims, 11 Drawing Sheets

CLUTCH DEVICE AND RETAINER THEREOF

CROSS-REFERENCE TO RELATED APPLICATIONS

This application claims priority to Japanese application no. 2019-047235, filed Mar. 14, 2019, which is herein incorporated by reference in its entirety.

BACKGROUND

Field

The present disclosure relates to a clutch device and a retainer thereof.

Description of Related Art

A clutch device is a driving force interrupting device that transmits a rotational driving force input through a rotational driving force input system (referred to as an "input system," hereinafter) to a rotational driving force output system (referred to as an "output system," hereinafter), and cancels the transmission.

The clutch device is provided with a friction plate (frictional plate) coupled to the input system and a clutch plate coupled to the output system and clamped to the friction plate, wherein the input system and the output system are coupled to and released from each other by clamping or releasing the friction plate and the clutch plate to or from each other.

The friction plate and the clutch plate are clamped to each other by pressing the friction plate against the clutch plate. The friction plate is pressed using a mechanism for pressing a clutch (a clutch pressing mechanism). The clutch pressing mechanism has a pressure plate that directly presses the friction plate, a clutch spring that applies a pressing force to the pressure plate, and a retainer that applies a load to the clutch spring.

The spring load applied to the clutch spring is determined as follows. First, a required clutch load that is required to prevent the friction plate and the clutch plate from sliding is obtained from a maximum torque value of an automobile such as a motorcycle. Once this required clutch load is obtained, the spring load on the clutch spring is determined in such a manner that the load of the pressure plate pressing the friction plate is equal to or greater than the required clutch load. The spring load on the clutch spring is determined on the basis of the maximum torque value in this manner, and is set to be constant regardless of the engine speed. Accordingly, the frictional plate and the clutch plate can be prevented from sliding in all rotation speed ranges.

On the other hand, given that the spring load on the clutch spring is determined on the basis of the maximum torque value, in case of an automobile with a large engine torque, the spring load also inevitably increases. In particular, for a motorcycle, the pressure plate that directly presses the friction plate is configured to be operated by a clutch lever operated by the rider. In other words, when the rider grasps the clutch lever, the pressure plate moves against the spring load of the clutch spring, and the force of the pressure plate pressing the frictional plate is released, thereby releasing the clamped state between the clutch plate and the frictional plate, and then the transmission of the rotational driving force to the output system is canceled (clutch disengagement), the rotational driving force being input via the input system. Thus, to disengage the clutch, the rider needs to perform the clutch operation by grasping the clutch lever with a force greater than the spring load of the clutch spring.

For these structural reasons, when driving a motorcycle that has a large engine torque, the rider typically requires a large force to operate the clutch lever manually, which tends to be a heavy burden on the rider. In reality, when driving a motorcycle with a large engine torque for a long period of time or when driving on a heavily trafficked road where gears need to be changed repeatedly, the burden tends to increase, and consequently the grip strength of the rider weakens. In order to cope with this situation, a high level of driving skill that not only improves the grip strength and other physical strengths but also enables smooth gear changes is necessary. Under such circumstances, only some people can enjoy motorcycles. Moreover, in particular, the types of motorcycles that can be enjoyed by riders who do not have strong grip strengths are limited due to the difficulty of the clutch lever operation itself. Unfortunately, it is not always easy to simultaneously fulfill the demand for reducing the strength required to operate the clutch lever and the demand for increasing the force of the clutch pressing mechanism pressing the friction plate and to secure the clamping between the friction plate and the clutch plate in all engine speed ranges. On the other hand, a technique disclosed in Japanese Patent No. 3808091, for example, has been proposed in order to realize these demands.

SUMMARY

However, there is room for further improvement in the abovementioned technology and the like.

Therefore, an object of the present disclosure is to provide a clutch device and a retainer thereof that are capable of allowing a large number of riders to enjoy riding motorcycles regardless of their physical strengths or driving skills, while ensuring the clamped state between the friction plate and the clutch plate in all engine speed ranges.

A retainer of a clutch device according to one aspect of the present disclosure is a retainer that holds a weight held so as to be slidable in a substantially radial direction around a rotation axis, and a push lever that swings in response to a sliding movement of the weight, and, upon rotation, applies a centrifugal force to the weight to cause the weight to slide in an outer circumferential direction and brings an abutting end of the push lever into abutment with a pressure plate of the clutch device to apply a predetermined load to the pressure plate, the retainer including a stopper that limits a movable range of the weight, wherein at least the abutting end of the push lever is formed of an elastically deformable member.

According to the retainer configured as described above or the clutch device including this retainer, by utilizing the phenomenon in which the centrifugal force acting on the weight increases as the rotation speed of the output system increases, the centrifugal force can be added to a pressing force generated by elastic means (such as a clutch spring) to apply a pressure load. Specifically, even when the pressing force generated by the elastic means is reduced, this reduced amount of pressing force can be compensated using the centrifugal force acting on the weight, so that the clamping force that prevents the friction plate and the clutch plate from sliding can be ensured at all times. In such a case, in a state of a low engine speed in which the required pressing force applied to the plates (the pressure plate, the clutch plate, the friction plate) is not so large, the pressing force can be reduced, and in a state of a high engine speed in which the pressing force is required, the pressing force can be compensated as the rotation speed of the input system (rotational driving force input system) increases.

In addition, in the retainer and the clutch device including the retainer, since the elastically deformable push lever is employed, not only is it possible to further narrow the gap between the retainer and the pressure plate, but also the push lever can be brought into abutment with or pressed against the pressure plate in the state of a lower engine speed, and a heavier object can be employed as the weight.

In the retainer described above, at least the abutting end of the push lever may be formed of a spring steel.

In the retainer described above, the push lever may be formed of a spring steel. In the retainer described above, the abutting end may be shaped in such a manner that the thickness of the abutting end gradually becomes small toward a tip thereof.

The stopper in the retainer described above may be an adjustable stopper that limits the movable range of the weight.

The present disclosure can provide a clutch device and a retainer thereof that are capable of allowing a large number of riders to enjoy riding motorcycles regardless of their physical strengths or driving skills, while ensuring the clamped state between the friction plate and the clutch plate in all engine speed ranges.

DETAILED DESCRIPTION

Configurations of the present disclosure are described hereinafter in detail on the basis of embodiments shown in the drawings.

A clutch device 1 is a type of a friction clutch and can be used in motorcycles, tricycles, and the like. The clutch device 1 of the present embodiment transmits a rotational driving force input via an input system (not shown) to an output system (not shown) and cancels the transmission. The input system is configured by an engine and a mechanism part that is coupled to the engine to drive and transmits the rotational driving force of the engine to the clutch device 1. The output system is configured by a mechanism part that inputs the driving force of the engine via the clutch device 1 and outputs the driving force as a driving force of driving wheels.

Figure 1:
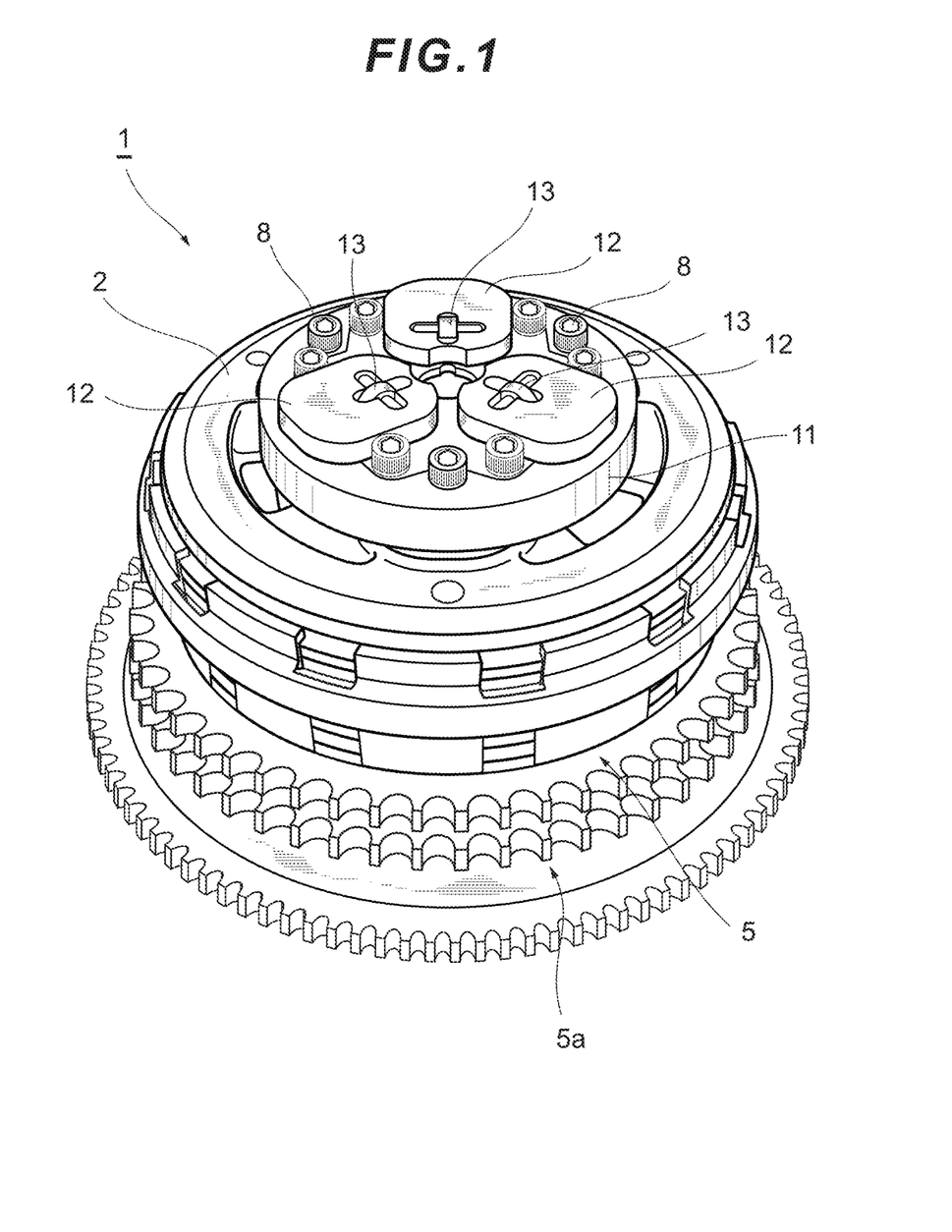
FIG. 1 is a perspective view of a clutch device according to an embodiment of the present disclosure.
Figure 2:
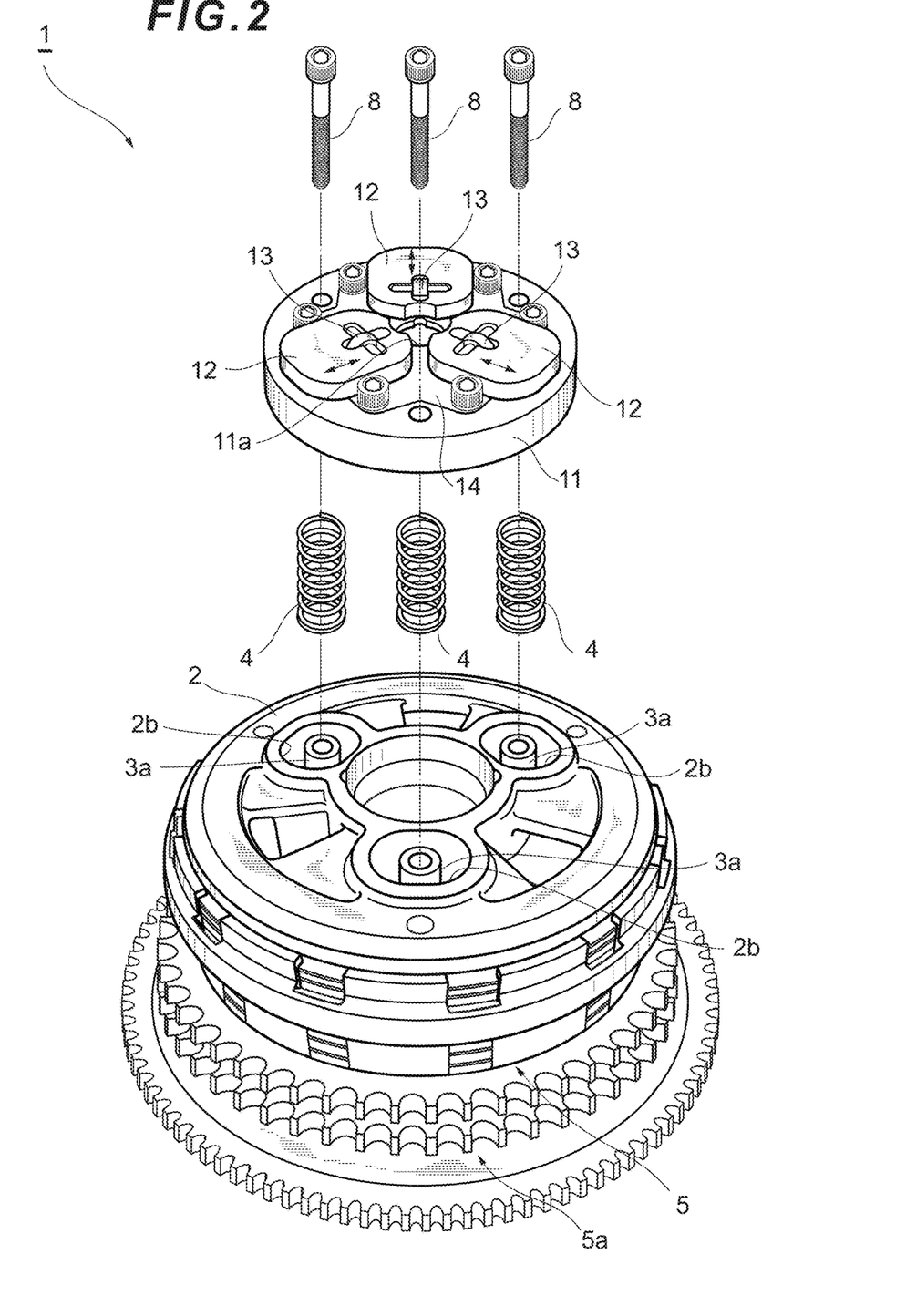
FIG. 2 is a perspective configuration diagram of the clutch device.

The clutch device 1 of the present embodiment includes a pressure plate 2, a clutch hub 3, a shell 5, a sprocket 5a, a clutch plate 6, a friction plate 7, screws 8, a retainer 11, weights 12, push levers 13, a guide 14, and the like (see FIGS. 1, 2 and the like).

[Configurations of the Pressure Plate and the Clutch Hub and the Members Therebetween]

Figure 3:
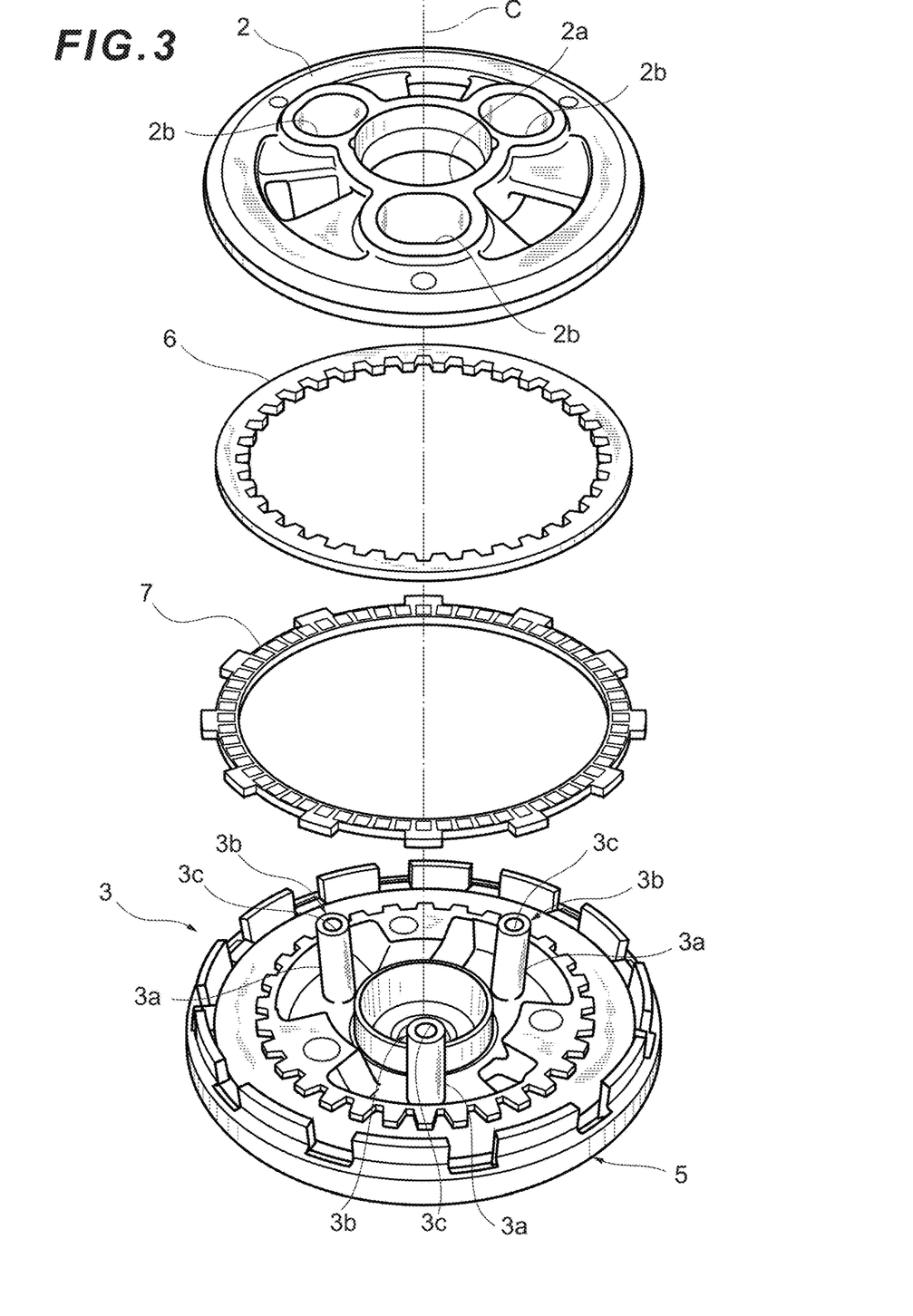
FIG. 3 is a perspective view of the clutch device in a state in which a pressure plate and a clutch hub are separated.

In the clutch device 1 of the present embodiment, the pressure plate 2, the clutch plate 6, and the friction plate 7 are interposed between the retainer 11 and the clutch hub 3 (see FIGS. 2 and 3). Clutch springs 4 each composed of a compression coil spring are held in a compressed state between the pressure plate 2 and the retainer 11 by the retainer 11 screwed to the clutch hub 3 by the screws 8. The sprocket 5a is provided outside the shell 5. Using this sprocket 5a, the shell 5 rotates about a central axis C (see FIG. 3) of the clutch device 1 by the drive of the engine.

The friction plate 7 is integrated at the shell 5 side. A plurality of the friction plates 7 are provided in multiple stages in an axial direction of the central axis C. The clutch plate 6 is interposed between the friction plates 7 adjacent to each other.

The clutch plate 6 is provided in an integrated manner on the clutch hub 3 side (see FIG. 3). A plurality of the clutch plates 6 are provided in multiple stages in the axial direction of the central axis C.

The clutch hub 3 is disposed inside the shell 5 so as to be rotatable about the central axis C. A main shaft, not shown, is inserted through the center of the clutch hub 3 and fixed thereto. Furthermore, columnar protrusions 3a protruding toward the pressure plate 2 are formed in the clutch hub 3 (see FIG. 3). In the present embodiment, three columnar protrusions 3a are provided at an equal distance from the central axis C at 120 degree intervals in a circumferential direction. Protruding end surfaces 3b of the three columnar protrusions 3a are substantially perpendicular to the central axis C. The protruding end surfaces 3b of these three columnar protrusions 3a are positioned at the same height. Screw holes 3c are formed in the respective three columnar protrusions 3a. These columnar protrusions 3a pass through insertion holes 2b of the pressure plate 2 and function as screw stoppers (stoppers) abutting against the retainer 11 in a screwed state.

A circular through-hole 2a is formed in the center of the pressure plate 2. In the pressure plate 2, for example, three insertion holes 2b are formed at an equal distance from the central axis C at circumferentially equal intervals. The columnar protrusions 3a of the clutch hub 3 are inserted through these insertion holes 2b. The clutch hub 3 and the pressure plate 2 are combined by passing the three columnar protrusions 3a of the clutch hub 3 through the respective three insertion holes 2b of the pressure plate 2. The clutch plate 6 of the closest stage to the pressure plate 2 comes into contact with a rear surface 2c of the pressure plate 2.

In the state in which the clutch hub 3 and the pressure plate 2 are combined as described above, the protruding end surfaces 3b of the columnar protrusions 3a slightly protrude from the insertion holes 2b on a front surface 2d side of the pressure plate 2. In addition, in the state in which the clutch hub 3 and the pressure plate 2 are combined, the clutch springs 4 are housed in the respective three insertion holes 2b, with the columnar protrusions 3a passing through the clutch springs 4 (see FIG. 2 and the like).

[Configuration of the Retainer]

Figure 4:
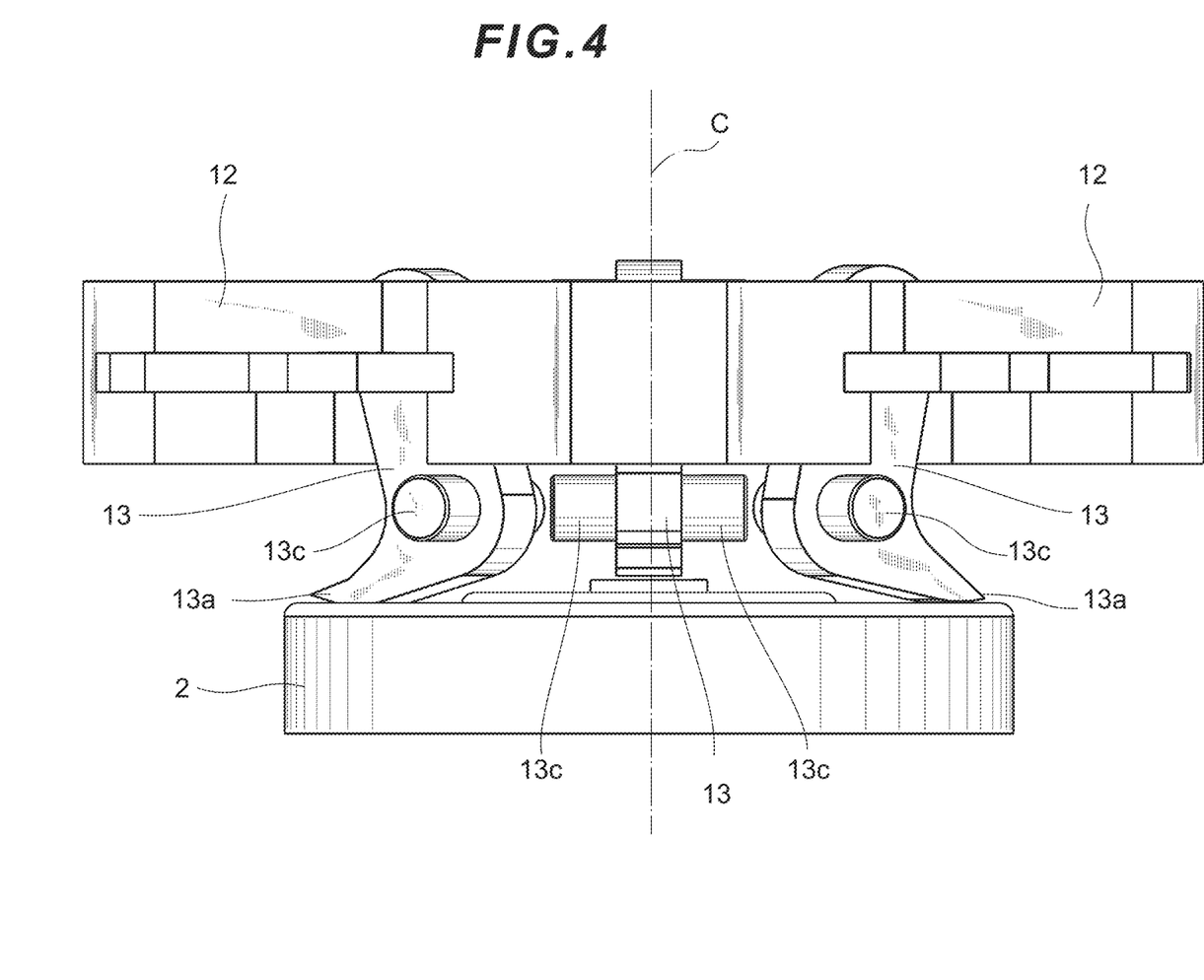
FIG. 4 is a diagram, viewed laterally with respect to the rotation axis, showing a retainer and the like in a state in which an abutting end of a push lever is in abutment with the pressure plate.
Figure 6:
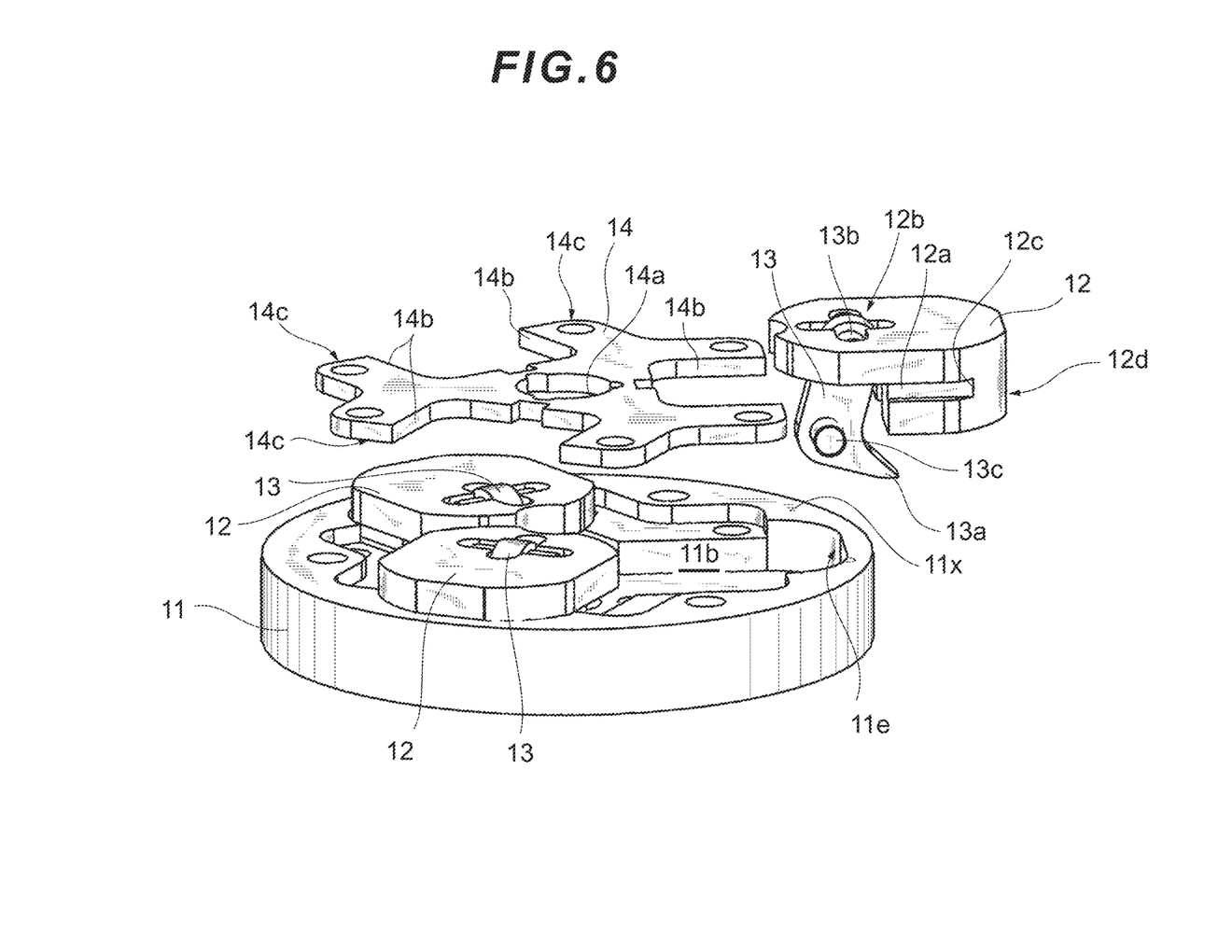
FIG. 6 is a perspective view showing a state in which the guide, the weight, and a part of the push lever are removed from the retainer.

The retainer 11 is a substantially circular member that holds the weights 12, the push levers 13, and the guide 14 and applies a centrifugal force to the weights 12 and the like when rotating (see FIG. 4 and the like). The retainer 11 of the present embodiment includes a rotation hole 11a corresponding to the rotation center, guide installation recessed portions 11b for installing the guide 14, movable spaces 11c formed to allow the weights 12 to slide, and shaft recessed portions 11d into which swing shafts 13c of the push levers 13 are fitted (see FIG. 4 and the like). For example, the movable spaces 11c that are shaped to match the weights 12 arranged at 120 degree intervals are formed in the retainer 11 of the present embodiment (see FIG. 7 and the like). Note that, for convenience, the side of the retainer 11 on which the weights 12 are arranged is referred to as a front surface 11x, and the side of the retainer 11 that faces the pressure plate 2 is referred to as a rear surface 11y. The weights 12 are held so as to be slidable in a radial direction of the retainer 11 and are provided so as to move toward an outer periphery in response to the centrifugal force when the retainer 11 rotates. The weights 12 may be formed of a material having a large specific gravity, such as brass. The radial direction described here includes not only a direction extending radially from the rotation center of the retainer 11 but also a direction in which the extension line does not pass through the rotation center. Guided grooves 12a into which guide rails 14b of the guide 14 are fitted, and engaging grooves 12b with which interlocking shafts 13b of the respective push levers 13 come into engagement, are formed in the respective weights 12 (see FIGS. 6, 7 and the like). The engaging grooves 12b, when activated, are structured to allow the interlocking shafts 13b to move in the axial direction; in the present embodiment, each of the engaging grooves 12b is structured to penetrate from one surface of the corresponding weight 12 to the other (see FIG. 8 and the like).

The push levers 13 are each a member that is provided so as to swing about a fulcrum in conjunction with the sliding movement of the weights 12. For example, the push levers 13 of the present embodiment are formed of a substantially L-shaped plate-like member, and are held by the retainer 11 in such a manner as to be able to swing in the radial direction around the boss-shaped swing shafts (fulcrums) 13c that protrude from the vicinity of the bent portions to both sides. The swing shafts 13c are fitted from the rear surface 11y side of the retainer 11 into the shaft recessed portions 13d provided on the rear surface 11y side (see FIG. 7 and the like).

Figure 7:
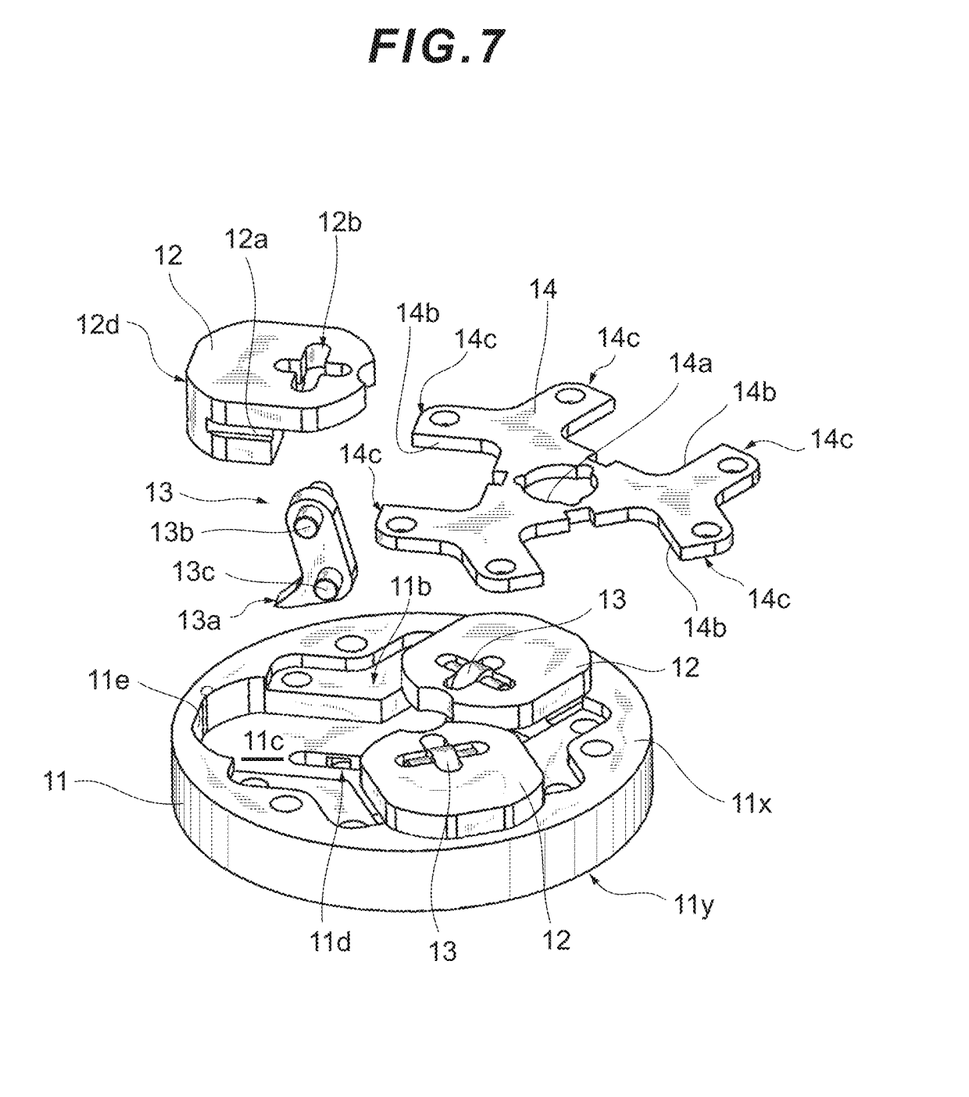
FIG. 7 is another perspective view showing the state in which the guide, the weight, and a part of the push lever are removed from the retainer.
Figure 8:
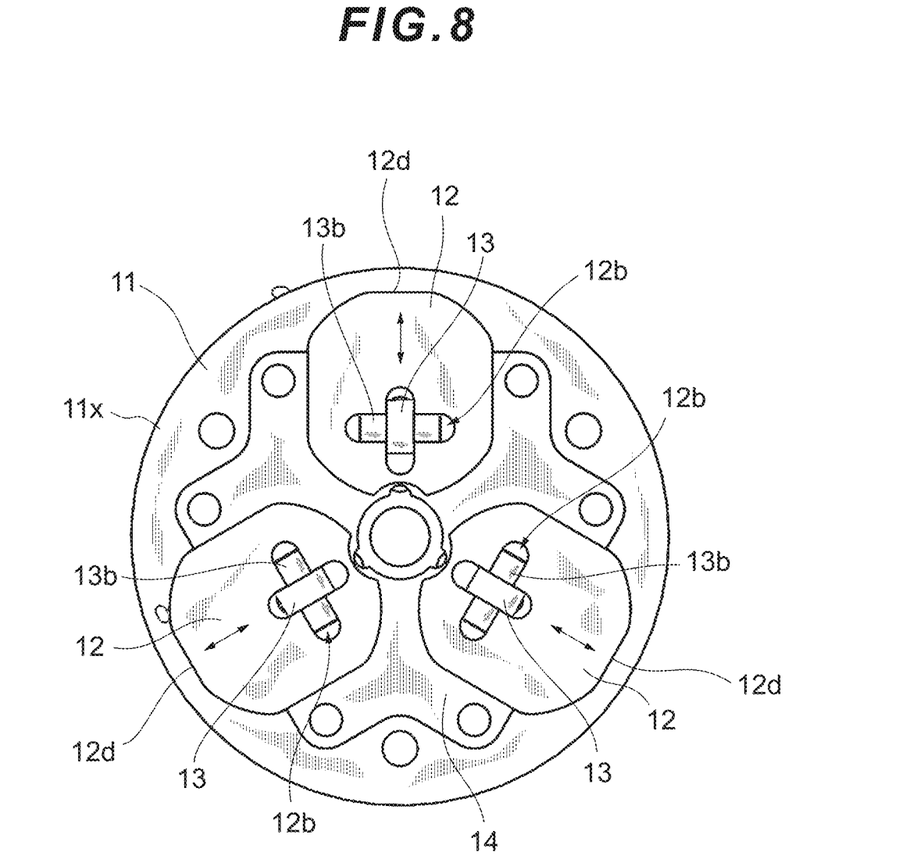
FIG. 8 is a plan view of the retainer in a state in which the guide, the weight, and the push lever are attached.
Figure 9:
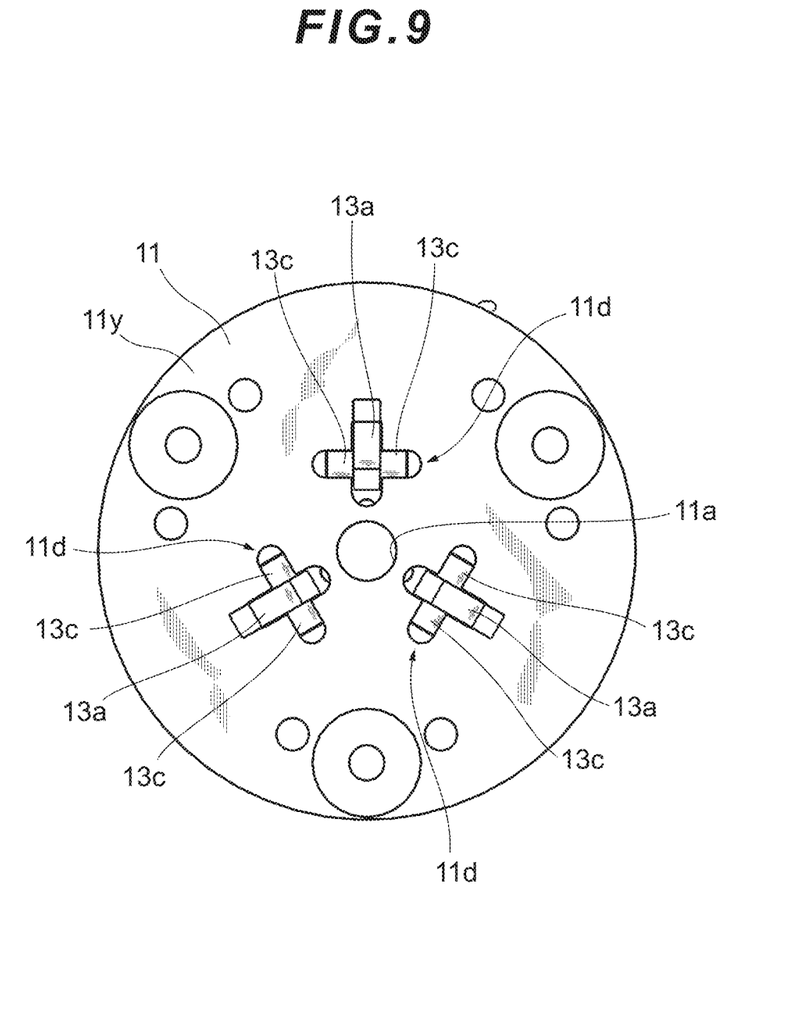
FIG. 9 is a bottom view of the retainer in a state in which the guide, the weight, and the push lever are attached.
Figure 10:
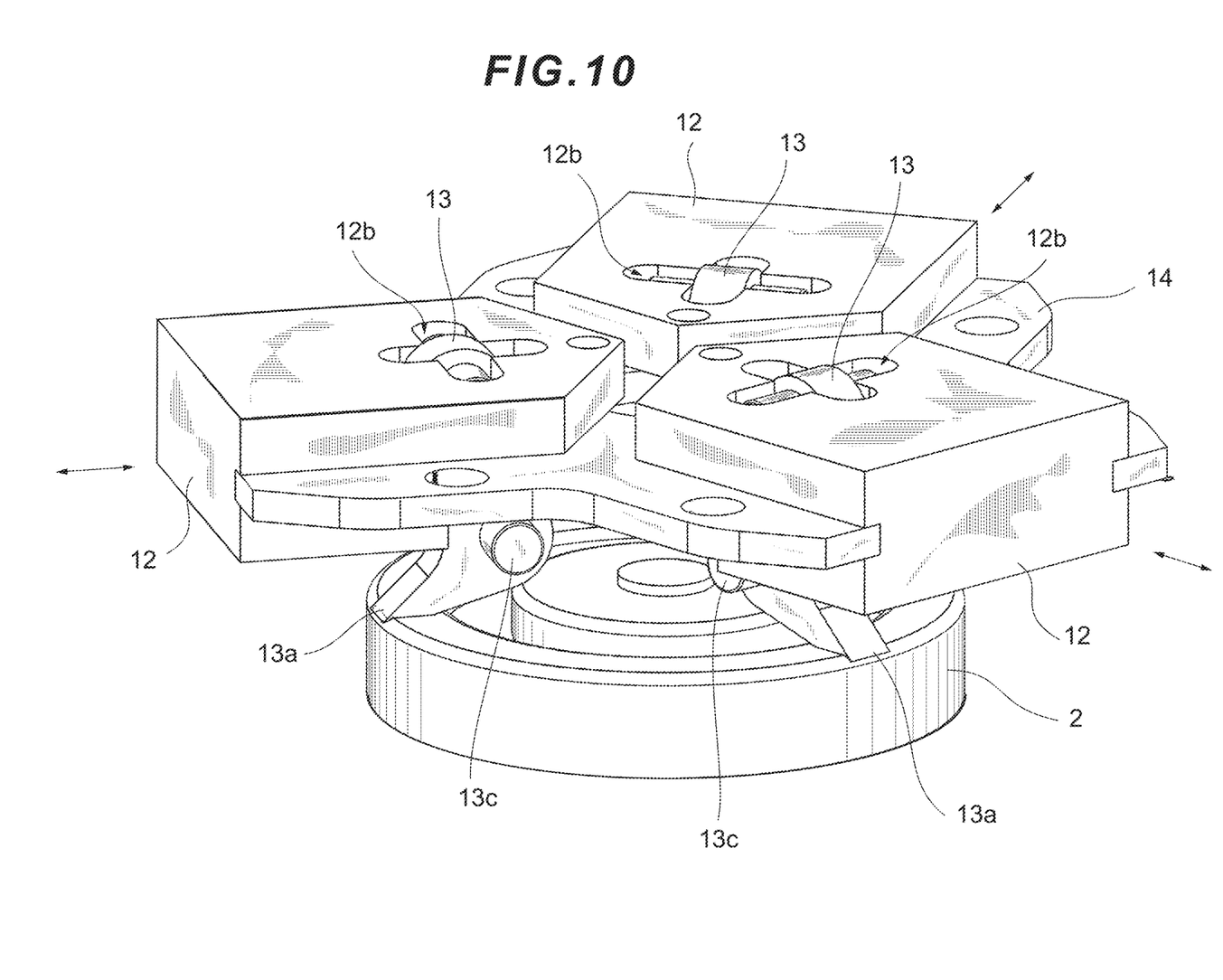
FIG. 10 is a perspective view showing an outline of the weight, the guide, the push lever, and the pressure plate in a retainer of another embodiment.

The boss-shaped interlocking shafts (points of action) 13b protruding to both sides are provided in the vicinity of respective upper ends of the push levers 13 (in the vicinity of end portions near the weights 12) (see FIG. 7 and the like). The interlocking shafts 13b come into engagement with the engaging grooves 12b of the weights 12 (see FIG. 6 and the like).

The guide 14 is a member that guides the weights 12 in the circumferential direction. The guide 14 of the present embodiment allows the three weights 12 to slide radially around a center hole 14a (radial weight guide) and has the guide rails 14b arranged at circumferentially equal intervals (120 degrees) (see FIGS. 6, 7 and the like). The guide rails 14b are fitted into the engaging grooves 12b of the respective weights 12.

The retainer 11 is further provided with stoppers that limit the movable range of each weight 12. In the present embodiment, outer rim portions 14c of the guide 14 are configured to come into abutment with deepest groove portions 12c of the guided grooves 12a of the respective weights 12, wherein the outer rim portions 14c are caused to function as stoppers that limit a radially inward movable range of the weights 12 (see FIGS. 6 and 7). Also, in the present embodiment, outer circumferential surfaces 12d of the weights 12 are configured to come into abutment with respective inner wall portions 11e on the outer periphery side of the movable spaces 11c of the retainer 11, wherein the inner wall portions 11e are caused to function as stoppers that limit a radially outward movable range of the weights 12 (see FIGS. 6 and 7).

Although not shown in particular, an adjustable stopper that is configured to be able to appropriately change the positions where the weights 12 come into abutment with the stoppers (e.g., change the radial length of each weight 12, or change the thickness of each outer rim portion 14c functioning as a stopper) may be employed. In this case, by changing the movable range of each weight 12, an upper limit of the pressing force applied to the pressure plate 2 from the push levers 13 can appropriately be changed as shown by, for example, the two-dot chain line in FIG. 11 (see FIG. 11).

Figure 5:
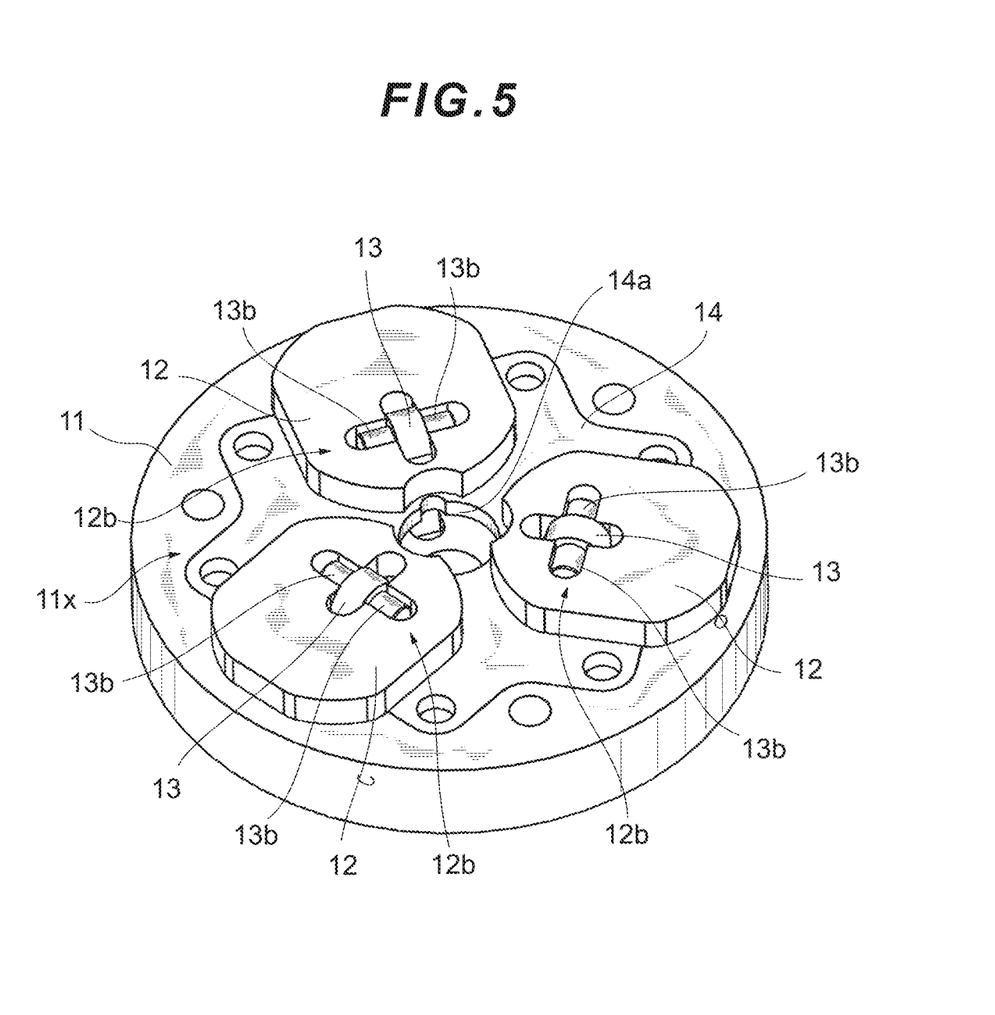
FIG. 5 is a perspective view of the retainer in a state in which a guide, weights, and push levers are attached.

A tip portion of each push lever 13 is now described (see FIGS. 4, 5 and the like). An abutting end 13a that comes into abutment with the front surface 2d of the pressure plate 2 and is pressed is formed at the tip portion of each push lever 13. The abutting end 13a is shaped into, for example, a claw that faces the outer periphery and gradually becomes thin toward the tip facing the outer periphery (see FIG. 5 and the like). Furthermore, a part of each push lever 13 that includes at least the abutting end 13a is formed of an elastically deformable member. For example, in the present embodiment, the entire push lever 13 is formed of a spring steel. The abutting end 13a formed of a spring steel deforms more easily than a conventional push lever (e.g., a push lever to which high-rigid lightweight material such as aluminum alloy is applied) (see FIG. 5 and the like).

As described above, in the clutch device 1, a centrifugal force acts as the retainer 11 rotates, moving the weights 12 toward the outer periphery along the guide rails 14b of the guide 14. When the weights 12 move toward the outer periphery, the interlocking shafts 13b of the respective push levers 13 that come into engagement with the engaging grooves 12b of the respective weights 12 also move toward the outer periphery. When the interlocking shafts 13b move toward the outer periphery, the push levers 13 swing about the respective swing shafts 13c, causing the abutting ends 13a to protrude and come into contact with the pressure plate 2 (the front surface 2d thereof) (see FIGS. 4, 5 and the like). The centrifugal force acting on the weights 12 increases as the speed of rotation of the retainer 11 increases, thereby increasing the force of the push levers 13 pushing the pressure plate 2.

According to the clutch device 1 of the present embodiment configured as described above, by utilizing the phenomenon in which the centrifugal force acting on the weights 12 increases as the rotation speed of the output system increases, the centrifugal force can be added to the spring pressing force generated by the clutch springs 4 to apply a pressure load. Specifically, even when the spring pressing force generated by the clutch springs 4 is reduced, this reduced amount of pressing force can be compensated using the centrifugal force acting on the weights 12, so that the clamping force that prevents the friction plates 7 and the clutch plates 6 from sliding can be ensured at all times.

Figure 11:
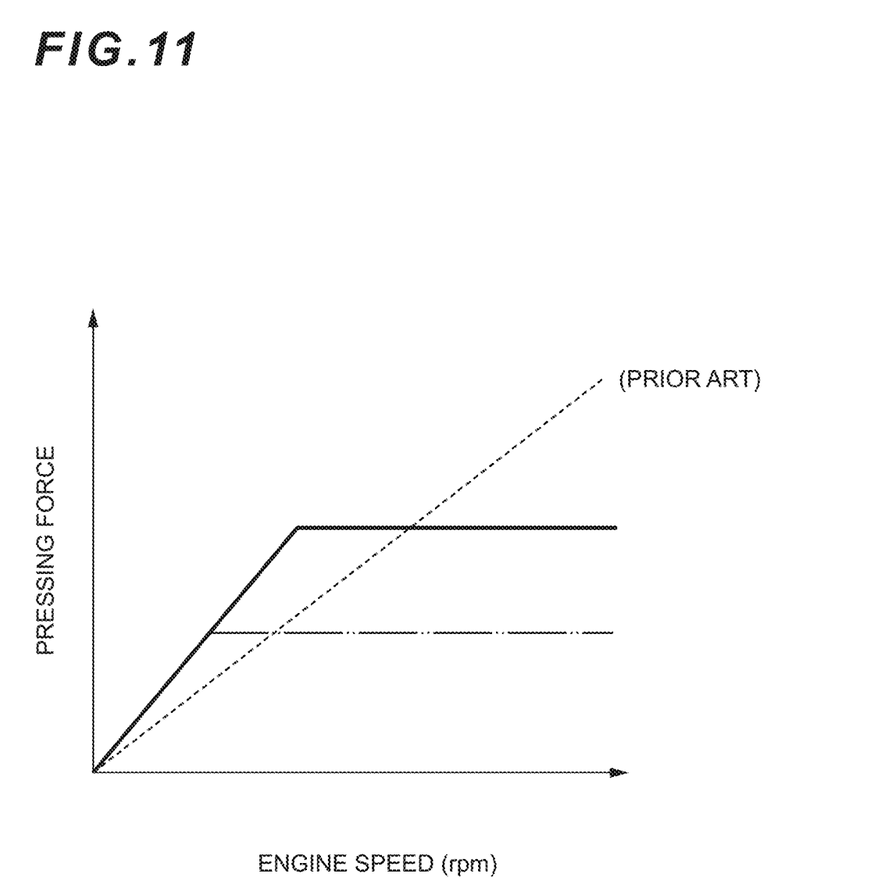
FIG. 11 is a graph showing the relationship between engine speeds and forces of the push lever pressing the pressure plate.

In other words, in the clutch device 1 according to the present embodiment, in a state of a low engine speed in which the required pressing force applied to each of the plates (the pressure plate 2, the clutch plates 6, the friction plates 7) with respect to the output system is not so large, the pressing force can be reduced, and in a state of a high engine speed in which the pressing force is required, the pressing force is compensated as the rotation speed of the input system (rotational driving force input system) increases. Specifically, in this clutch device 1, since the pressing force on each plate with respect to the output system is made variable so that the pressing force becomes necessary only when needed, the force required to operate the clutch lever can be reduced significantly as compared with a different structure (a motorcycle having a structure in which the pressing force on each plate with respect to the output system is always set to be constant on the basis of generation of the maximum torque, or the clutch device of this motorcycle). In addition, the clutch device 1 of the present embodiment that employs the elastically deformable push levers 13, the weights 12 that slide, and the stoppers that limit the movable ranges of the weights 12, have more advantages as follows:

The pressing force that acts on the pressure plate 2 from the push levers 13 can be provided with an upper limit (see FIG. 11). Therefore, when the engine speed is high (that is, when a large centrifugal force acts on the weights 12), the pressing force can be prevented from becoming excessively large. Consequently, the force required to operate the clutch lever can be prevented from becoming excessively large. Such a configuration contributes to the realization of excellent operability of the clutch lever such as more comfortable clutch lever operation when trying to obtain an acceleration force by changing gears in a situation where, for example, the vehicle is cruising at high speed with a high engine speed.

Since the push levers 13 are elastically deformable, the ratio of the range in which the push levers 13 and the pressure plate 2 are in abutment with each other is large, the range accounting for the movable ranges of the weights 12.

The gap between the retainer 11 and the pressure plate 2 can be further narrowed.

Heavier objects can be applied as the weights 12 (even when heavier objects are applied, the pressing force applied at the time of high-speed engine rotation does not become excessively large due to the functions of the stoppers). Therefore, in a state of a low engine speed, the push levers 13 can be brought into abutment with or pressed against the pressure plate 2, applying a larger pressing force to the pressure plate 2.

By applying heavier objects as the weights 12, the clutch springs 4 with a weaker spring force (elastic force) can be employed.

The force required to operate the clutch lever (the grip strength for grasping the clutch lever to perform clutch operation) can be reduced. Such a configuration is favorable for riders in a situation where, for example, the riders wish to keep grasping the clutch lever while waiting at a traffic light.

The force required to operate the clutch lever and relevant operational feeling can be changed by appropriately changing the weight and movable ranges of the weights 12, the shape and rigidity (elastic force) of the push levers 13, and the clutch springs 4 in in response to the output of the engine.

By employing the retainer 11 configured as described above, the clutch device 1 of the present embodiment can allow a large number of riders to enjoy riding motorcycles regardless of their physical strengths or driving skills, while ensuring the clamped state between the friction plates 7 and the clutch plates 6 in all engine speed ranges.

The foregoing embodiment is a preferred example of the present invention, but the present invention is not limited thereto; various modifications can be made without departing from the gist of the present invention.

The present invention is suitably applied to a clutch device and a retainer thereof in a vehicle such as a motorcycle.

What is claimed is:

1. A retainer assembly of a clutch device that transmits a rotational driving force and cancels the transmission, the retainer assembly comprising:
    a retainer configured to be mounted to a pressure plate of the clutch device for rotation about a rotation axis;
    a weight supported by the retainer and guided by a guide to move linearly in a substantially radial direction relative to the rotation axis,
    a push lever rotatably engaged with the weight, the push lever configured to swing in response to the linear movement of the weight, the push lever including an abutting end formed of an elastically deformable member; and
    a stopper located in a position to limit a movable range of the linear movement of the weight,
    wherein, upon rotation of the retainer, a centrifugal force is applied to the weight to cause the weight to slide in an outer circumferential direction and bring the abutting end of the push lever into abutment with the pressure plate of the clutch device to apply a predetermined load to the pressure plate.

2. The retainer assembly according to claim 1, wherein the abutting end of the push lever is formed of a spring steel.

3. The retainer assembly according to claim 2, wherein the entire push lever is formed of a spring steel.

4. The retainer assembly according to claim 2, wherein the abutting end is shaped in such a manner that a thickness of the abutting end gradually becomes small toward a tip thereof.

5. The retainer assembly according to claim 4, wherein the stopper is an adjustable stopper that adjusts the movable range of the weight.

6. A clutch device, comprising the retainer assembly according to claim 1.

* * * * *